Sept. 15, 1964  L. E. HASKETT  3,148,830
THERMOSTATIC CONTROL WITH ADJUSTABLE DEAD ZONE
Filed Feb. 12, 1963

INVENTOR.
LESTER E. HASKETT
BY Norman A. Witt

ATTORNEY

United States Patent Office 3,148,830
Patented Sept. 15, 1964

3,148,830
THERMOSTATIC CONTROL WITH ADJUSTABLE
DEAD ZONE
Lester E. Haskett, St. Louis, Mo., assignor to Vapor
Corporation, Chicago, Ill., a corporation of Delaware
Filed Feb. 12, 1963, Ser. No. 258,053
8 Claims. (Cl. 236—68)

This invention relates to a thermostatic control with an adjustable dead zone, and wherein a narrower dead zone may be provided.

In the present invention, a thermostat of the electro-conductive liquid column type, such as a mercury column type, is arranged in combination with electrical circuit means to define a thermostatic control for controlling the position of a motorized valve or damper for the purpose of regulating temperature. The liquid column type thermostat includes a pair of spaced liquid reservoirs or bulbs, one of which is sensitive to the temperature of the area to be regulated, and the other of which is provided with a heater for applying auxiliary heat to the thermostat. A pair of spaced apart contacts are electrically connected to the liquid column and to the electrical circuit means which regulates the operation of the heater and the motorized valve or damper.

Heretofore, the above type of thermostat and associated electrical circuit control means operated such that when the electro-conductive liquid or mercury rose above the upper spaced contact or fell below the lower spaced contact, the valve or damper would be moved by the motor in a direction to bring the temperature back into the dead zone. It will be understood that the dead zone is the temperature range between the upper and lower spaced contacts. And heretofore, the minimum dead zone width was limited by mechanical considerations in spacing the upper and lower contacts in the thermostat.

It is therefore an object of this invention to provide a thermostatic control wherein the effective minimum dead zone width as limited by mechanical considerations may be decreased, and may be adjusted.

A further object of this invention resides in providing a thermostatic control having a mercury column type thermostat with an adjustable dead zone width wherein electrical circuit means is provided so that the mercury column will rise and fall between two preselected temperatures within the band defined by the spaced contacts on the thermostat.

A still further object of this invention resides in a thermostatic control having a mercury column type thermostat with a pair of bulbs or liquid reservoirs, one of which has a heater associated therewith, wherein means is provided to quickly change the resistance to the heater to control the thermostat; and thereby effectively narrow the dead zone of the thermostat.

Other objects, features and advantages of the invention will be apparent from the following detailed disclosure, taken in conjunction with the accompanying sheet of drawings, wherein like reference numerals refer to like parts, in which.

Figure 1:
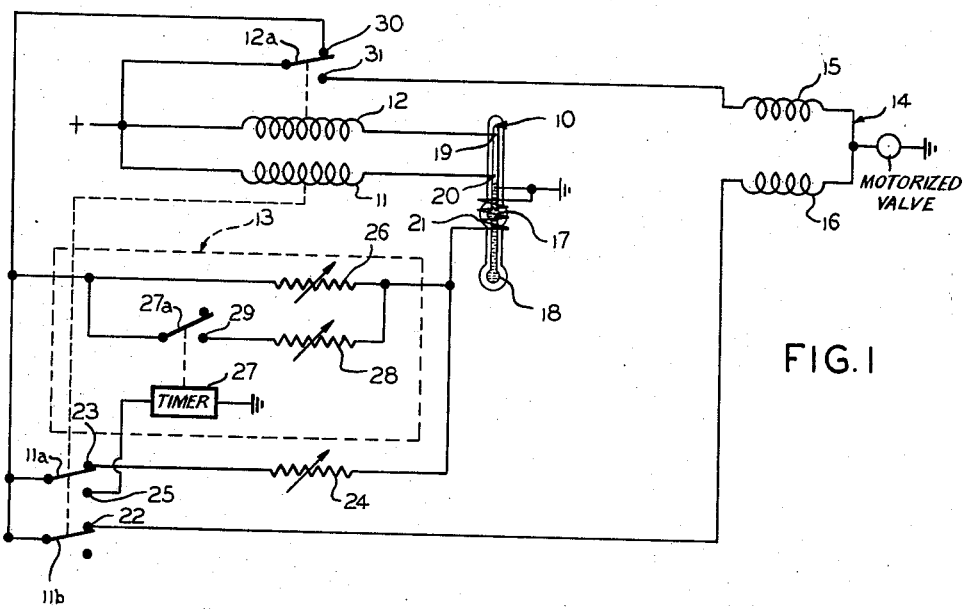
FIG. 1 is a schematic electrical diagram of the thermostatic control according to the invention, and showing the relays in de-energized position.

Referring now to the drawings, and particularly to FIG. 1, the thermostatic control of the present invention includes a thermostat generally indicated by the numeral 10, relays 11 and 12, and a switching or cycling circuit 13. The control operates a motorized valve or damper generally indicated by the numeral 14 to position the valve or damper so that the temperature is maintained in the dead zone. Thus, the motorized valve or damper includes a reversible motor having a winding or coil 15 that when energized moves the damper in one direction to provide more cooling, and a winding or coil 16 that when energized moves the valve or damper in another direction to provide less cooling.

The thermostat 10 is preferably of the well known electro-conductive liquid column type, such as a mercury column type; and includes upper and lower bulbs or liquid reservoirs 17 and 18, and upper and lower spaced electrical contacts 19 and 20. A heating coil 21 is wound about the upper bulb 17 and serves to recurrently apply auxiliary heat to the thermostat, as will be hereinafter explained.

One side of the heater 21 is connected to the bottom of the mercury column below the lower contact 20, which is connected to ground or the negative line. The other end of the heater is connected in the control circuitry that responds to the position of the top of the mercury column in the thermostat.

When the mercury column rises to and above the lower contact 20, it effects energization of relay 11 which is connected on one side to the thermostat contact 20 and on the other side to the positive line. The circuitry as shown in FIG. 1 illustrates the positions of the relays and the switches in deenergized condition which takes place when the temperature detected by the thermostat is such that the top of the mercury column is below the lower contact 20, and during this condition of the circuit, the coil 16 of the valve motor 14 is energized to move the valve in the direction for effecting less cooling. Energization of the relay 11 causes deenergization of the coil 16 by pulling the switch or contact arm 11b of the relay 11 away from the contact 22. Simultaneously, the switch or contact arm 11a is pulled away from the contact 23 and thereby takes the variable resistor 24 out of the circuit with the heater 21, and further brings the switch arm 11a into engagement with the contact 25 to energize the switching or cycling circuit 13. Actually the variable resistor 26 is always in the circuit with the heater 21, except when the relay 12 is energized. Closing of the contact arm 11a energizes the cycling circuit 13 which includes a timer relay 27 that cycles the variable resistor 28 into and out of parallel with the resistor 26 by movement of the switch arm 27a into and out of engagement with the contact 29. Thus, the switching circuit 13 is placed into operation upon energization of the relay 11. During movement of the top of the mercury column between the spaced contacts of the thermostat, the valve motor 14 is stationary, since neither coil 15 nor coil 16 is energized.

When the switching circuit 13 is energized, the timer 27 cycles on and off for any predetermined time, such as cycling on for 1¾ of a second and off for 2 seconds to effectively increase and decrease the current flowing through the heater 21. Quite obviously, the current would be increased when the timer cycles on to place the resistor 26 in parallel with the resistor 28, and thereby increase the heat being applied to the upper bulb 17. Conversely, the resistance in series with the heater 21 would be increased by removing the resistor 28 from parallel connection with the resistor 26 and thereby decrease the current flowing through the heater 21 and allow the bulb 17 to somewhat cool.

When the top of the mercury column reaches the upper contact 19 of the thermostat, the relay 12 will be additionally energized to move the switch arm 12a out of engagement with the contact 30 and into engagement with the contact 31 and thereby energize the coil 15 of the motor 14 to move the valve in a direction to obtain core cooling. By disengaging the arm 12a from the contact 30, the heater 21 is completely deenergized to allow the bulb 17 to cool even more.

The values of resistors 26 and 28, together with the timer frequency, are selected so that when the temperature is at a desired set point, the variation of heat on the upper bulb 17 of the thermostat causes the mercury column to rise and fall between two preselected temperatures within the band $T_1$ to $T_2$. The band $T_1$ to $T_2$ is represented on the thermostat by the contacts 19 and 20, respectively.

Figure 2:
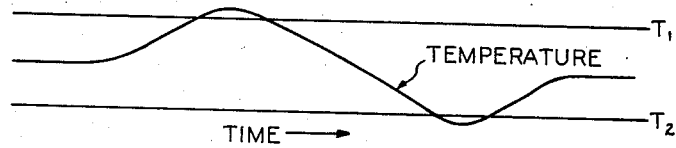
FIG. 2 is a graphical diagram illustrating the dead zone width of a heretofore known thermostatic control wherein the band width is solely controlled by the spacing of the electrical contacts in the thermostat.

In the standard thermostat control, the relays 11 and 12 would operate at $T_1$ and $T_2$, respectively, as illustrated graphically in FIG. 2.

Figure 3:
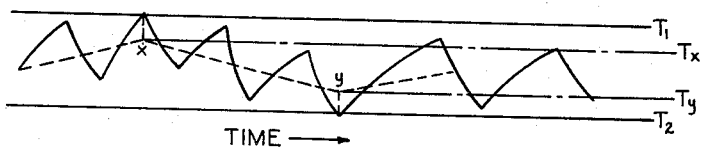
FIG. 3 is a graphical diagram showing the operation of the thermostatic control of the present invention and illustrating the ability to narrow the dead zone width.

With the cycling or switching circuit 13 added in the present invention, the relays 11 and 12 operate at points X and Y, respectively, giving a dead zone which is narrower than $T_1$ to $T_2$ as shown in FIG. 3. If the cycling circuit 13 is adjusted so that the rise and fall of the mercury column is exactly equal to $T_1$ minus $T_2$, the dead zone will be zero.

Further, a change in temperature at the thermostat will shift the cycling band as shown in FIG. 3 causing the mercury column to operate relays 11 and 12 with a smaller temperature deviation than with the standard heretofore known circuit. Thus, the cycling or switching circuit 13 provides a method of decreasing the effective width of the dead zone. Still further, the cycling or switching circuit 13 permits quick changing of the resistance to the heater for more precise control of the dead band zone.

The timer 27 may be one of several types, such as a motor operated switch, a cycling thermostat (which would have to be in the temperature controlled medium), an electronic switching circuit (electronic tubes or transistors), or a temperature compensated thermal cycler, or any other suitable type.

Figure 4:
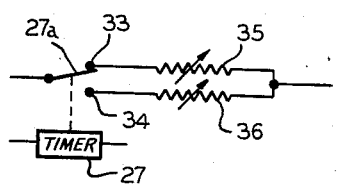
FIG. 4 is a partial electrical schematic diagram showing an alternate switching or cycling arrangement for the heater.

An alternate form of switching or cycling circuit is illustrated in FIG. 4, wherein the timer 27 operates its switching arm 27a between contacts 33 and 34 to alternately switch the heater resistance between the resistors 35 and 36. In this case the values of the resistors would differ substantially. Again a method of quickly changing the resistance to the heater is provided.

Figure 5:
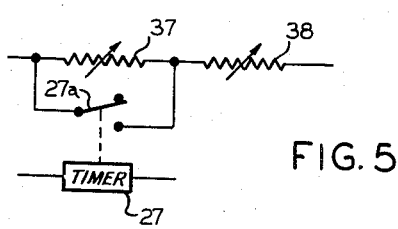
FIG. 5 is a still further modification of a switching arrangement for the heater in the thermostatic control of the present invention.

A still further modified form of switching or cycling circuit is shown in FIG. 5 wherein variable resistors 37 and 38 are connected in series and a shorting circuit is provided to selectively short out the resistor 37 by means of the timer 27 and its switch arm 27a.

It will be understood that modifications and variations may be effected without departing from the scope of the novel concepts of the present invention, but it is understood that this application is to be limited only by the scope of the appended claims.

The invention is hereby claimed as follows:

1. A thermostatic control in combination with a motorized valve comprising, an electro-conductive liquid column type thermostat having first and second spaced liquid reservoirs and first and second spaced electrical contacts, a heater for said first reservoir for applying auxiliary heat to the thermostat, said second reservoir being subjected to the heat of the medium within which the thermostat is placed and is to be temperature controlled, a cycling circuit, a first electrically responsive switching means responsive to contact of the liquid in the thermostat with said first spaced electrical contact to maintain said motorized valve stationary and to connect said cycling circuit with said heater so that the current flowing through the heater is cyclically changed, and a second electrically responsive switching means responsive to contact of the liquid in the thermostat with said second spaced electrical contact to deenergize said cycling circuit and said heater and energize said motorized valve in one direction.

2. A thermostatic control in combination with a motorized valve, said control operating said valve in opposite directions for controlling temperature in a given medium, said control being electrically connected to said valve and comprising, an electro-conductive liquid column type thermostat having first and second spaced liquid reservoirs and upper and lower spaced electrical contacts, a heater for one of said reservoirs for applying auxiliary heat to the thermostat and the other reservoir being subjected to the temperature in said medium, circuit means responsive to the liquid column being below said lower electrical contact for operating said motorized valve in one of said directions, a cycling circuit selectively connected to said heater to cyclically vary the current flowing therethrough, circuit means responsive to contact between the liquid column and said lower contact to stop said motorized valve and to energize said cycling circuit, and a circuit means responsive to contact between the liquid column and said upper contact for operating said motorized valve in the other of said directions and for deenergizing said cycling circuit.

3. A thermostatic control in combination with a motorized valve, said control operating said valve in opposite directions for controlling temperature in a given medium, said control being electrically connected to said valve and comprising, an electro-conductive liquid column type thermostat having first and second spaced liquid reservoirs and upper and lower spaced electrical contacts, a heater for one of said reservoirs for applying auxiliary heat to the thermostat and the other reservoir being subjected to the temperature in said medium, circuit means responsive to the liquid column being below said lower electrical contact for operating said motorized valve in one of said directions and to connect a fixed resistance circuit in series with said heater, a cycling circuit selectively connected to said heater to cyclically vary the current flowing therethrough, circuit means responsive to contact between the liquid column and said lower contact to stop said motorized valve and to energize said cycling circuit and to modify said fixed resistance circuit, and a circuit means responsive to contact between the liquid column and said upper contact for operating said motorized valve in the other of said directions and for deenergizing said cycling circuit and to deenergize said fixed resistance circuit.

4. A thermostatic control in combination with a motorized valve, said control operating said valve in opposite directions for controlling temperature in a given medium, said control being electrically connected to said valve and comprising, an electro-conductive liquid column type thermostat having first and second spaced liquid reservoirs and upper and lower spaced electrical contacts, a heater for one of said reservoirs for applying auxiliary heat to the thermostat and the other reservoir being subjected to the temperature in said medium, circuit means responsive to the liquid column being below said lower electrical contact for operating said motorized valve in one of said directions, a cycling circuit selectively connected to said heater to cyclically vary the current flowing therethrough, said cycling circuit including a variable resistance circuit and timer means for cycling same to quickly change the resistance load in series with said heater, circuit means responsive to contact between the liquid column and said lower contact to stop said motorized valve and to energize said cycling circuit, and a circuit means responsive to contact between the liquid column and said upper contact for operating said motorized valve in the other of said directions and for deenergizing said cycling circuit.

5. A thermostatic control in combination with a motorized valve, said control operating said valve in opposite directions for controlling temperature in a given medium, said control being electrically connected to said valve and comprising, an electro-conductive liquid column type thermostat having first and second spaced liquid reservoirs and upper and lower spaced electrical contacts, a heater for one of said reservoirs for applying auxiliary heat to the thermostat and the other reservoir being subjected to the temperature in said medium, circuit means responsive to the liquid column being below said lower electrical contact for operating said motorized valve in one of said directions, a cycling circuit selectively connected to said heater to cyclically vary the current flowing therethrough, said cycling circuit including a plurality of resistors adapted to be connected in parallel and means for cycling one of said resistors in and out of the circuit to vary the resistance load to said heater, circuit means responsive to contact between the liquid column and said lower contact to stop said motorized valve and to energize said cycling circuit, and a circuit means responsive to contact between the liquid column and said upper contact for operating said motorized valve in the other of said directions and for deenergizing said cycling circuit.

6. A thermostatic control in combination with a motorized valve, said control operating said valve in opposite directions for controlling temperature in a given medium, said control being electrically connected to said valve and comprising, an electro-conductive liquid column type thermostat having first and second spaced liquid reservoirs and upper and lower spaced electrical contacts, a heater for one of said reservoirs for applying auxiliary heat to the thermostat and the other reservoir being subjected to the temperature in said medium, circuit means responsive to the liquid column being below said lower electrical contact for operating said motorized valve in one of said directions, a cycling circuit selectively connected to said heater to cyclically vary the current flowing therethrough, said cycling circuit including a plurality of resistors of different value and means for cycling each in and out of series with said heater to vary the resistance load in series therewith, circuit means responsive to contact between the liquid column and said lower contact to stop said motorized valve and to energize said cycling circuit, and a circuit means responsive to contact between the liquid column and said upper contact for operating said motorized valve in the other of said directions and for deenergizing said cycling circuit.

7. A thermostatic control in combination with a motorized valve, said control operating said valve in opposite directions for controlling temperature in a given medium, said control being electrically connected to said valve and comprising, an electro-conductive liquid column type thermostat having first and second spaced liquid reservoirs and upper and lower spaced electrical contacts, a heater for one of said reservoirs for applying auxiliary heat to the thermostat and the other reservoir being subjected to the temperature in said medium, circuit means responsive to the liquid column being below said lower electrical contact for operating said motorized valve in one of said directions, a cycling circuit selectively connected to said heater to cyclically vary the current flowing therethrough, said cycling circuit including a plurality of resistors in series and means for cyclically shorting out one of the resistors, circuit means responsive to contact between the liquid column and said lower contact to stop said motorized valve and to energize said cycling circuit, and a circuit means responsive to contact between the liquid column and said upper contact for operating said motorized valve in the other of said directions and for deenergizing said cycling circuit.

8. A thermostatic control in combination with a motorized valve, said control operating said valve in opposite directions for controlling temperature in a given medium, said control being electrically connected to said valve and comprising, an electro-conductive liquid column type thermostat having first and second spaced liquid reservoirs and upper and lower spaced electrical contacts, a heater for one of said reservoirs for applying auxiliary heat to the thermostat and the other reservoir being subjected to the temperature in said medium, circuit means responsive to the liquid column being below said lower electrical contact for operating said motorized valve in one of said directions and to connect a fixed resistance circuit in series with said heater, a cycling circuit for modifying said fixed resistance circuit and to cyclically vary the resistance load in series with said heater, a cycling circuit selectively connected to said heater to cyclically vary the current flowing therethrough, circuit means responsive to contact between the liquid column and said lower contact to stop said motorized valve and to energize said cycling circuit, and a circuit means responsive to contact between the liquid column and said upper contact for operating said motorized valve in the other of said directions and for deenergizing said cycling circuit and to deenergize said fixed resistance circuit.

References Cited in the file of this patent
UNITED STATES PATENTS

| | | |
|---|---|---|
| 2,656,111 | Lehane et al. | Oct. 20, 1953 |
| 2,886,246 | Gustafsson et al. | May 12, 1959 |
| 2,935,657 | Thunberg | May 3, 1960 |